June 3, 1969 W. O. MUNROE 3,448,228
ACCELERATION SENSING DEVICE
Filed Feb. 8, 1967 Sheet 1 of 3

INVENTOR.
William O. Munroe
BY *Warren, Brodie Cypher & Anglin*
Attorneys

INVENTOR.
William O. Munroe
BY
Attorneys

United States Patent Office 3,448,228
Patented June 3, 1969

3,448,228
ACCELERATION SENSING DEVICE
William O. Munroe, Rodeo, Calif., assignor to Amot Controls Corporation, a corporation of California
Filed Feb. 8, 1967, Ser. No. 614,610
Int. Cl. H01h 35/14
U.S. Cl. 200—61.45    12 Claims

ABSTRACT OF THE DISCLOSURE

An acceleration sensing device for use with engines, compressors, fan drives and various machinery for signalling and/or automatically shutting down the equipment consisting of a spring-loaded lever assembly held by a potted magnet which controls a valve or switch. The lever snaps to a tripped position when the inertia of the lever assembly plus the force of the loading springs exceeds the holding force of the magnet upon a predetermined shock (acceleration).

Background of the invention

This invention pertains to measuring and testing apparatus as broadly set forth in the United States Patent Office Manual of Classification and particularly to vibration sensing apparatus with an inertia element releasably coupled by a magnet.

The prior art devices such as the Hardway Patent 2,942,456 have utilized dual magnets in combination with a special method of hinging the lever and inertia element which has resulted in a device which is difficult to initially align and to service in the field. The prior art devices have difficulty in operating valves which require more than minimal actuating force. Furthermore, there is no known prior art acceleration device which may be reset by widely varying reset fluid pressures.

Summary

The acceleration device of the present invention consists briefly of a body 1, a lever assembly 3, hinge means 5 pivotally connecting the lever assembly to the body for movement in a single plane between latched and tripped positions, an armature 7 mounted on the body adjacent one end of the lever assembly, a potted magnet 9 mounted on an end of the lever assembly for registration with the armature and for holding the lever assembly in the latched position, and biasing means mounted on the body holding the hinge at a predetermined axis of rotation and biasing the lever assembly with a resultant force to the tripped position and the resultant tripping force being relatively less than the latching force between the armature and magnet.

An object of the present invention is to provide a more sensitive acceleration device which will snap to a tripped position with greater force upon a predetermined g force and remain in the tripped position until intentionally reset.

Another object is to provide an acceleration device as characterized above having a more rugged construction and designed to be easily assembled and aligned and more easily serviced.

Still another object is to provide an acceleration device which will operate a valve and an electrical switch and further may be re-set manually or automatically; automatic re-setting to be accomplished even under widely varying re-set pressure.

A further object is to provide a device which will trip at a pre-set g force over a wide range of frequencies.

Description of the preferred embodiments

Figure 1:
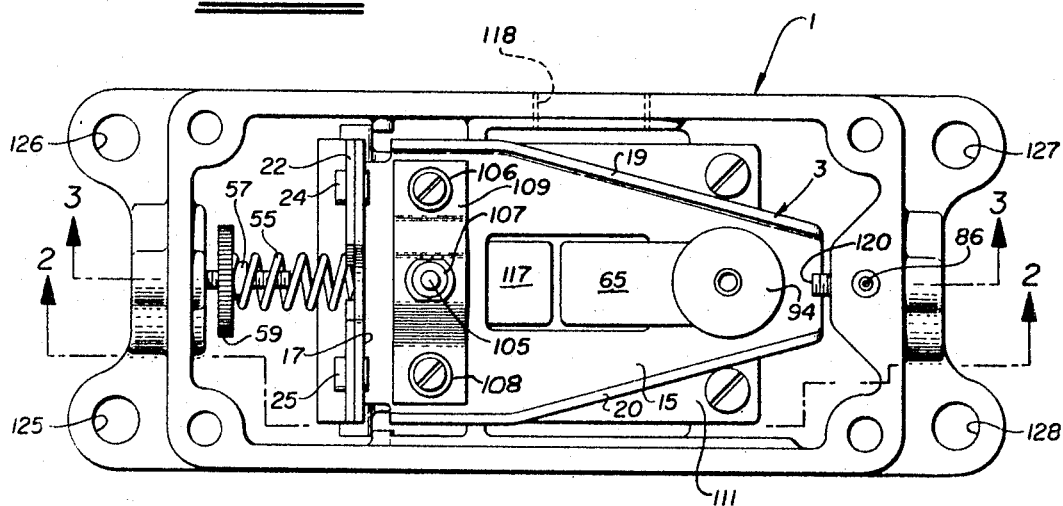
FIGURE 1 is a top view of the device with the cover removed.

Body 1 may be made of various materials and is here constructed of precision cast aluminum. A cover 11, also made of precision cast aluminum, is formed for sealing engagement with the body and is sealed by gasket 13. The body carries the major working parts and the cover carries the major portion of the reset mechanism.

The lever assembly 3 here consists of an elongated lever member 15 and an angularly related arm 17. Lever arm 15 is tapered and formed with stiffening flanges 19 and 20.

Hinge means 5 connecting the lever assembly to the body consists of an upper member 22 connected to arm 17 by rivets 24 and 25 and a lower member 27 connected to the body by fasteners 29 and 30. The lower member is shaped to provide a socket 32 for receiving knife edge 34 formed on upper member 22 which is formed in the shape of a J.

A major feature of the device is the use of a potted magnet having a very high "gripping" force which diminishes rapidly with distance from the armature. The magnet comprises an inner magnetic member 37 having north and south poles at its opposite faces 39 and 40. The lines of force travel from face 39 through the surrounding metal cup 42 and return to the opposite pole face 40 across a very small concentric gap formed between inner member 37 and cup 42. Rim 44 of the cup does not touch the face 46 of the armature 7 but is spaced by screw 135 threadably mounted in the body through armature 7 and contacting the inner magnetic member 37.

A unique feature of the present device is the provision and arrangement of the biasing means acting upon the lever assembly which here consists of a pair of spaced load springs 49 and 50 seated on the body and positioned by spring retainers 52 and 53 in engagement with elongated lever member 15. The load springs exert a force of about 7½ pounds each.

Resisting the force of the load springs is a spring 55 biasing the short lever arm 17 and adjustably retained on hub 57 of adjustment wheel 59 which is threadably mounted on screw 61. Load springs 49 and 50 and adjustment spring 55 are angularly related whereby their resultant force biases knife edge 34 into engagement with socket 32. It may be seen that compression of adjustable spring 55 assists magnet 9 in holding the lever assembly in the latched position thereby increasing the g force necessary to unlatch the lever assembly with increased compression. At the same time, the increased compression of adjustment spring 55 also holds the knife edge in the socket member of the hinge more securely as the device is set for higher g forces. The interaction of the load springs and the adjustment spring, particularly as the adjustment spring is compressed prevents the lever assembly from resonating at the hinge point at the higher frequencies and thereby failing to trip at the preset *g* force.

The reset means carried by the cover of the device is adapted for connection to a fluid pressure source and includes a fluid pressure actuated pin 63 mounted for reciprocation and positioned to engage and move the lever to the latched position and a re-set overtravel spring 65 carried by the lever for engaging the reciprocating pin. A manually operated button 67 projecting through and mounted for reciprocation in a cover member 69 is connected to the pin 63. Where it is desirable to reset the device by remote control the re-set means includes a cylinder 71 having an inside cylinder wall 73 receiving a piston 75 mounted for reciprocation in the cylinder and carrying pin 63. The piston is formed with annular rings 77 and 78 and retain O ring 79. Spring 81 biases the pin to a retracted position. Fluid pressure enters the cylinder via passageway 83 formed in the cover 69 through orifice 84. The cover orifice is registered with an orifice 86 formed in the body member which connects with passage 87 terminating in port 88. Cylinder 71 is held in the cover by screws 90 and 91. The re-set means is designed to operate under a range of pressures from 40 to 250 p.s.i. As set forth above, pin 63 moves against a spring 65 attached to the lever by screw 93 which also holds inertia member 94 to the end of the lever. The provision of the spring prevents injury to the magnet.

The lever in the latched position holds ball 96 in its seat 97 blocking passage 98 connecting with passage 99 terminating in port 100. The assembly for retaining the ball 96 consists of a ball retainer 101 biased by spring 103 guided by bolt 105 which carries adjusting nut 107. The assembly is mounted on the lever by bracket 109 and provides for the holding closed of valve 96 during the initial movement of lever 15 from latched to tripped position.

The device shown in the drawings includes a small SPDT snap switch which is used as a pilot for remote electric signal devices. The switch 110 is mounted on a switch mounting bracket 111 and insulated from the body by insulator strip 113. The actuator pin 115 is mounted for movement by overtravel spring 117 connected to the lever 15. The wire connections are made at the terminals 130 and extend from the body through opening 118.

The lever assembly moves against stop screw 120 to the tripped position. In order to remove the lever assembly from the body, threaded stud screw 122 is removed from boss 123, spring 55 is removed and then the entire lever assembly can easily be slipped out of the body.

In operation, the device is firmly attached to either a vertical or horizontal wall, depending upon the direction of vibration, by screws or bolts through openings 125, 126, 127 and 128 formed in the body. The device is sensitive in the direction parallel to the axis of the re-set plunger and this axis must be parallel to the direction of anticipated motion on the protected machine. Thus when used to detect vibration in the horizontal plane, the vibration device should be attached to a vertical surface, with the re-set port 88 at the bottom. The vent port 95 which will then be on the top side, should be protected against the entrance of foreign matter by a street "EL" or other fitting if the unit is not connected to a large common vent line.

If brackets are to be used in mounting the units on irregular surfaces, they should be of sufficient thickness and rigidly secured to prevent generation of undesired, unrelated vibration.

Figure 2:
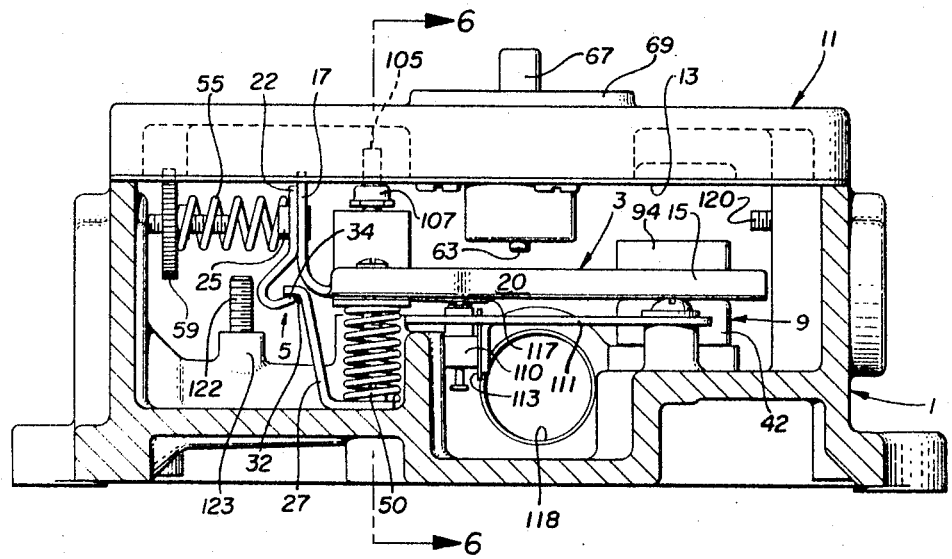
FIGURE 2 is a cross-sectional view of the device shown in FIGURE 1 taken substantially along the line 2—2 and with the cover in place.
Figure 4:
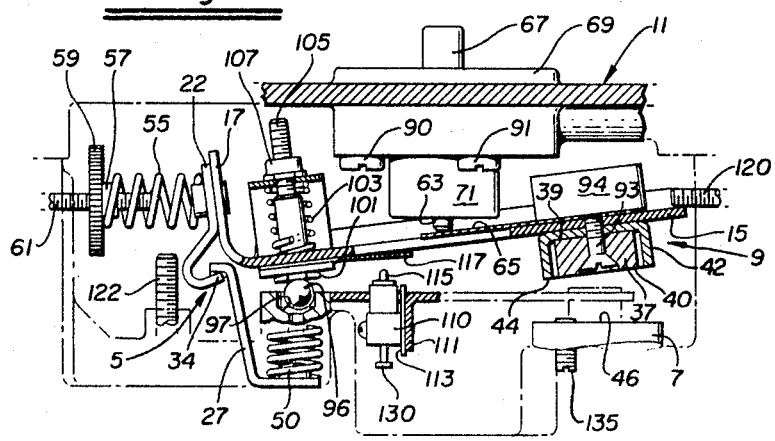
FIGURE 4 shows portions of FIGURE 3 illustrating the lever assembly in the tripped position.
Figure 3:
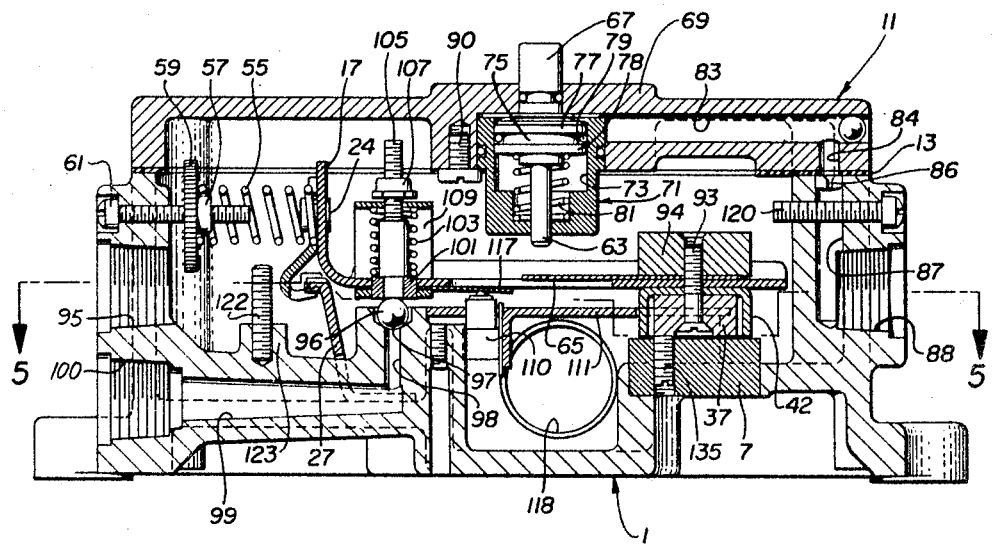
FIGURE 3 is a cross-sectional view of the device taken substantially along the line 3—3 in FIGURE 1 showing the lever assembly in the latched position.
Figure 5:
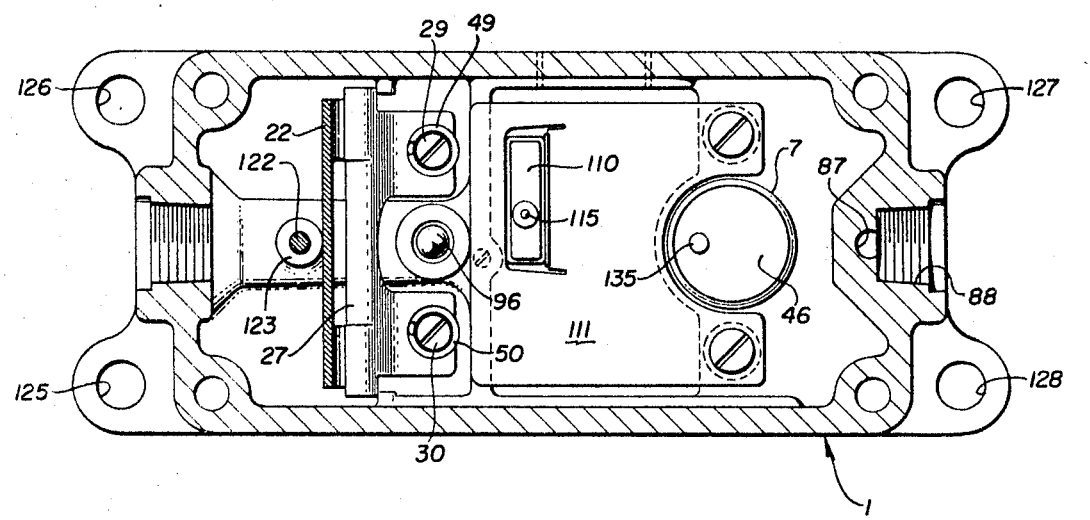
FIGURE 5 is a cross-sectional view of the device taken substantially along the plane of line 5—5 of FIGURE 3.
Figure 6:
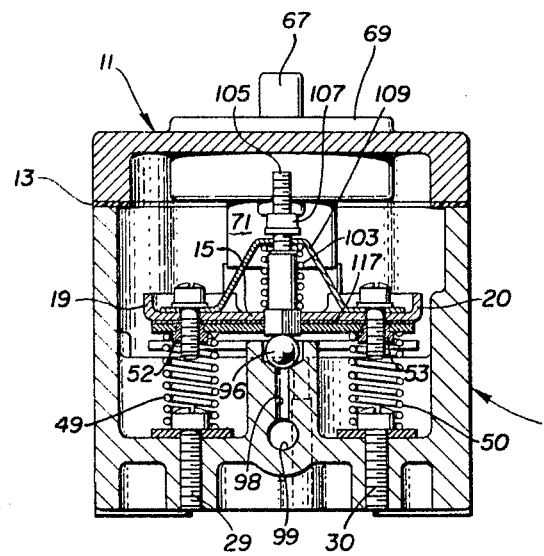
FIGURE 6 is a cross-sectional view of the device taken substantially on the plane of line 6—6 of FIGURE 2.

During startup of the engine, compressor or other device to be protected, the lever is moved to the latched position as shown in FIGURE 2 and either held there manually by pressing the re-set button or by supplying pressure to piston 75 to hold pin 63 against the lever. The adjustment wheel 59 is rotated to compress spring 55 until the magnet 37 holds the lever firmly in the latched position. The adjustment wheel is then rotated slightly more so that the lever will not trip under normal operating conditions but only at a slightly higher *g* force. When the shock force exceeds the holding force of the magnet and the adjustable spring 55, load springs 49 and 50 snap the lever to the tripped position as shown in FIGURE 4. Movement of the lever assembly permits check ball 96 to lift from its seat 97 permitting control air to move from passage 98 and out vent port 95. At the same time, overtravel spring 117 lifts off pin 115 of the switch 110 which sends a control signal to a remote location. Lever 15 moves into engagement with stop screw 120 and overtravel spring 65 moves into engagement with pin 63 of the re-set means. The lever assembly is reset to the latched position by manually pressing button 67 or sending reset fluid pressure through inlet port 88 thereby moving piston 75 against spring 81 and pin 63 moves lever assembly 15 until magnet 37 latches with armature 7.

Applicant's device with its potted magnet having a strong latching magnetic force is able to counter the force of load springs 49 and 50 and thereby hold a valve and an electric switch in the off position. This fact coupled with the rugged construction makes the device extremely versatile in industrial applications. It may be said, however, that the device is capable of operating the valve alone or the switch alone.

As previously mentioned, one of the objects of the present device was to provide easy servicing. One of the areas in this device which needs periodic servicing is the ball valve 96. This may be easily removed and cleaned by merely removing screws 106 and 108. Bracket 109 and spring 103 holding ball retainer 101 are then easily removed.

I claim:
1. An acceleration sensing device comprising:
   a body;
   a lever assembly;
   hinge means comprising members pivotally connecting said lever assembly to said body for movement in a single plane between latched and tripped positions;
   an armature mounted on said body adjacent one end of said lever;
   a potted magnet mounted on an end of said lever for registration with said armature and for holding said lever in the latched position;
   biasing means mounted on said body holding said hinge members at a predetermined axis of rotation and biasing said lever assembly with a resultant force to move said lever assembly to said tripped position upon unlatching; and
   said resultant tripping force being relatively less than the latching force between said armature and magnet.
2. An acceleration sensing device as characterized in claim 1 wherein:
   said hinge means comprises an upper member having a knife edge and a lower member formed with a socket for receiving said knife edge.
3. An acceleration sensing device as characterized in claim 2 wherein:
   said lever assembly is formed with an elongated member and an angularly related arm;
   said biasing means consists of first and second spaced springs biasing said elongated member to said tripped position and a third spring mounted on said body biasing said angularly related arm to said latched position; and
   adjustment means mounted on said body and connected to said third spring for varying the biasing force of said third spring to preset said device for tripping at various *g* forces.

4. An acceleration sensing device as characterized in claim 1 comprising:

reset means carried by said body adapted for connection to a fluid pressure source including a fluid pressure actuated pin mounted for reciprocation and positioned to engage and move said lever assembly to said latched position; and a reset overtravel spring carried by said lever assembly for engaging said reciprocating pin.

5. An acceleration sensing device as characterized in claim 4 wherein:

said reset means includes a cylinder, a piston mounted for reciprocation in said cylinder and carrying said pin.

6. An acceleration device as characterized in claim 1 comprising:

said body being formed with an inlet port, a first passage communicating with said port, a normally closed check valve in said first passage, valve retainer means carried by said lever assembly in registration with said check valve holding said valve in the closed position when said lever assembly is in the latched position, a second passage communicating with said valve, and a vent port in said second passage.

7. An acceleration device as characterized in claim 6 comprising:

an electrical switch mounted on said body having a pin positioned for registration with and held in a closed position by said lever assembly in its latched position and movable to an opened position in the tripped position of said lever assembly.

8. In an acceleration sensing device having a body, a lever pivotally mounted on said body for movement between latched and tripped positions, magnet and armature members providing a magnetic couple mounted on said lever and body for movement into magnetically coupled position in said latched position and into spaced apart magnetically decoupled position in said tripped position, and biasing means urging said lever to tripped position, the improvement comprising said magnet member being constructed as a potted magnet having a magnetic core and a surrounding magnetic flux-conducting sleeve connected to one end of said core and having an end substantially co-planar to the opposite end of said core to provide a magnet face with an annular air gap therein, and said armature member having a face juxtaposed to said magnet face in said coupled position and said armature face being formed and dimensioned to span said air gap, said magnet and armature members being mounted to move said faces away from each other to define said magnetically decoupled position.

9. In an acceleration sensing device as characterized in claim 8, said biasing means comprising, a main spring mounted between said body and lever and urging said lever to tripped position, a relatively weaker secondary spring mounted between said body and lever and applying a force to said lever in opposition to said main spring, and manually engageable means for adjusting said secondary spring force to pre-set said device for tripping at various $g$ forces.

10. In an acceleration sensing device as characterized in claim 9, reset means carried by said body and comprising, a fluid pressure actuator mounted for reciprocation and positioned to engage and move said lever to latched position, and a manually engageable member connected to said actuator and extending from said body for manual movement of said actuator to displace said lever to latched position.

11. An acceleration sensing device as characterized in claim 10, and a reset overtravel spring carried by said lever for engagement by said actuator.

12. In an acceleration sensing device as characterized in claim 8, a valve, valve actuating means carried by said lever and having a relatively moveable part and spring biasing means therefor positioned to engage and hold said valve in closed position in the latched position of said lever, said last named spring biasing means functioning to hold said valve in closed position during an initial displacement of said lever from latched to tripped position.

References Cited

UNITED STATES PATENTS 2,986,615  5/1961  Hardway _____ 200—61.45
3,035,450  5/1962  Hardway _____ 73—492

ROBERT K. SCHAEFER, *Primary Examiner.*

W. GINSBURG, *Assistant Examiner.*

U.S. Cl. X.R.

73—71; 340—262